United States Patent
Ausbrooks

(10) Patent No.: US 10,301,952 B2
(45) Date of Patent: May 28, 2019

(54) DUAL VOLUTE TURBOCHARGER TO OPTIMIZE PULSE ENERGY SEPARATION FOR FUEL ECONOMY AND EGR UTILIZATION VIA ASYMMETRIC DUAL VOLUTES

(71) Applicant: BorgWarner Inc., Auburn Hills, MI (US)

(72) Inventor: Mike Ausbrooks, Candler, NC (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 15/309,481

(22) PCT Filed: May 19, 2015

(86) PCT No.: PCT/US2015/031558
§ 371 (c)(1),
(2) Date: Nov. 8, 2016

(87) PCT Pub. No.: WO2015/179386
PCT Pub. Date: Nov. 26, 2015

(65) Prior Publication Data
US 2017/0183975 A1    Jun. 29, 2017

Related U.S. Application Data

(60) Provisional application No. 62/000,315, filed on May 19, 2014.

(51) Int. Cl.
*F01D 9/02* (2006.01)
*F02B 37/02* (2006.01)
(Continued)

(52) U.S. Cl.
CPC ............ *F01D 9/026* (2013.01); *F02B 37/025* (2013.01); *F02M 26/05* (2016.02); *F02M 26/06* (2016.02);
(Continued)

(58) Field of Classification Search
CPC ........ F01D 9/026; F02M 26/05; F02M 26/06; F02M 26/24; F02B 37/025; F05D 2220/40; Y02T 10/144
See application file for complete search history.

(56) References Cited

U.S. PATENT DOCUMENTS

| 94,868 A * | 9/1869 | Chase ....................... F03B 3/00 |
| | | 415/123 |
| 3,270,495 A | 9/1966 | Connor |

(Continued)

FOREIGN PATENT DOCUMENTS

| CN | 101111683 A | 1/2008 |
| CN | 101368488 A | 2/2009 |

(Continued)

OTHER PUBLICATIONS

Chinese Office Action dated Oct. 9, 2017 ; Application No. 201580026962.7; Applicant: BorgWarner Inc.; 14 pages.
(Continued)

*Primary Examiner* — Patrick D Maines
(74) *Attorney, Agent, or Firm* — BrooksGroup

(57) ABSTRACT

A product for use in a turbocharger system. A turbine housing may define a center core that is circular in shape with a circumference. The turbine housing may define a first volute that extends for a length around only a part of the circumference of the center core, and a second volute that may be positioned radially outside the first volute and that may extend entirely around the circumference of the center core. The first volute and the second volute may define first
(Continued)

and second exhaust gas passages through the turbine housing that may be asymmetric. All points of the second volute may be radially outside the first volute from the center core over the entire length of the first volute.

14 Claims, 3 Drawing Sheets

(51) Int. Cl.
*F02M 26/05* (2016.01)
*F02M 26/06* (2016.01)
*F02M 26/24* (2016.01)

(52) U.S. Cl.
CPC ......... *F02M 26/24* (2016.02); *F05D 2220/40* (2013.01); *Y02T 10/144* (2013.01)

(56) References Cited

U.S. PATENT DOCUMENTS

| | | | |
|---|---|---|---|
| 3,313,518 A * | 4/1967 | Nancarrow | F01D 17/12 415/13 |
| 3,383,092 A * | 5/1968 | Cazier | F02B 37/02 415/186 |
| 3,552,876 A * | 1/1971 | Updike | F01D 9/026 415/205 |
| 3,557,549 A | 1/1971 | Webster | |
| 4,179,892 A * | 12/1979 | Heydrich | F02B 37/00 60/605.2 |
| 4,389,845 A * | 6/1983 | Koike | F01D 9/026 415/145 |
| 4,512,714 A * | 4/1985 | Kaesser | F01D 17/146 415/151 |
| 4,689,959 A | 9/1987 | Houkita et al. | |
| 4,718,235 A | 1/1988 | Kawamura | |
| 4,730,456 A | 3/1988 | Tadokoro et al. | |
| 4,886,416 A | 12/1989 | Wunderlich | |
| 5,092,126 A | 3/1992 | Yano | |
| 6,073,447 A * | 6/2000 | Kawakami | F01D 9/026 60/602 |
| 6,216,459 B1 | 4/2001 | Daudel et al. | |
| 6,324,847 B1 * | 12/2001 | Pierpont | F02B 37/02 415/116 |
| 6,672,061 B2 | 1/2004 | Schmid et al. | |
| 7,513,114 B2 | 4/2009 | Sumser et al. | |
| 7,562,529 B2 | 7/2009 | Kuspert et al. | |
| 8,522,547 B2 | 9/2013 | Sumser et al. | |
| 2008/0317593 A1 * | 12/2008 | Lombard | F01D 17/143 415/224 |
| 2009/0047121 A1 * | 2/2009 | Whiting | F01D 9/026 415/144 |
| 2009/0060719 A1 * | 3/2009 | Haugen | F01D 9/026 415/145 |
| 2010/0024419 A1 * | 2/2010 | Pierpont | F01N 13/107 60/624 |
| 2011/0079009 A1 * | 4/2011 | Kratschrner | F01D 9/026 60/605.1 |
| 2011/0274539 A1 * | 11/2011 | Koenigsegg | F01D 9/026 415/204 |
| 2012/0222419 A1 | 9/2012 | Hittle et al. | |
| 2013/0195639 A1 | 8/2013 | Serres et al. | |
| 2014/0003910 A1 * | 1/2014 | Brinkert | F01D 9/026 415/71 |

FOREIGN PATENT DOCUMENTS

| | | |
|---|---|---|
| DE | 4242494 C1 | 9/1993 |
| JP | S56113015 A | 9/1981 |
| JP | 20081450 A | 1/2008 |
| JP | 200913873 A | 1/2009 |
| JP | 2010229828 A | 10/2010 |
| JP | 2011208614 A | 10/2011 |
| WO | 2005061870 A1 | 7/2005 |
| WO | 2009005665 A1 | 1/2009 |
| WO | 2014140598 A1 | 9/2014 |

OTHER PUBLICATIONS

International Search Report and Written Opinion; dated Jun. 11, 2015; for International Application No. PCT/US2015/031558; 12 pages.

Sauerstein et al. The Dual-Volute-VTG from BorgWarner—A New Boosting Concept for DI-SI engines (2009) ; 27 Pages.

Chinese Office Action dated Jun. 4, 2018 : Application No. 201580026962.7: Applicant BorgWarner Inc.; 14 pages.

* cited by examiner

DUAL VOLUTE TURBOCHARGER TO OPTIMIZE PULSE ENERGY SEPARATION FOR FUEL ECONOMY AND EGR UTILIZATION VIA ASYMMETRIC DUAL VOLUTES

CROSS REFERENCE TO RELATED APPLICATIONS

This application claims the benefit of U.S. Provisional Application No. 62/000,315, filed May 19, 2014.

TECHNICAL FIELD

The field to which the disclosure generally relates includes turbocharger systems for internal combustion engines, and more particularly, includes exhaust gas driven turbine arrangements for turbocharger systems.

BACKGROUND

Engine intake systems may typically include a charging system wherein exhaust gas generated by the combustion of fuel passes through a turbine which drives a compressor. Engine intake air may be mixed with recirculated exhaust gases and may be directed through the compressor which charges the intake system of the engine.

SUMMARY OF ILLUSTRATIVE VARIATIONS

A number of illustrative variations may include a product for use in a turbocharger system. A turbine housing may define a center core that is circular in shape with a circumference. The turbine housing may define a first volute that extends for a length around only a part of the circumference of the center core, and a second volute that may be positioned radially outside the first volute and that may extend entirely around the circumference of the center core. The first volute and the second volute may define first and second exhaust gas passages through the turbine housing that may be asymmetric. All points of the second volute may be radially outside the first volute from the center core over the entire length of the first volute.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
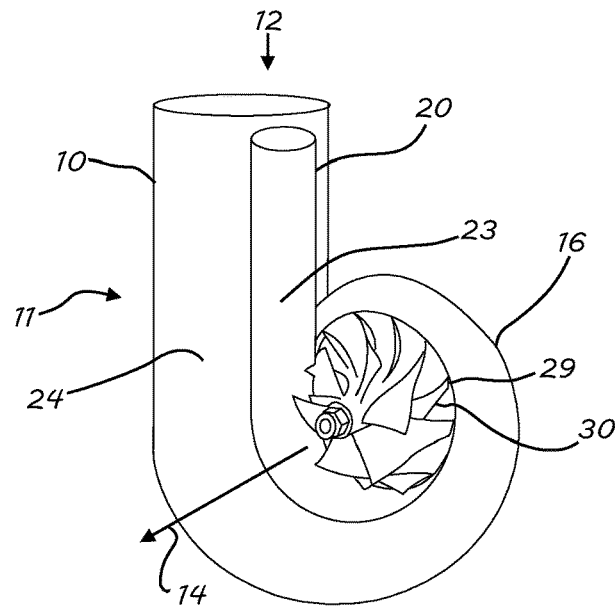
FIG. 1 is a schematic illustration of a dual volute turbocharger turbine according to a number of variations.

In a number of variations represented by FIG. 1, a product in the form of a turbocharger turbine 11 may include a turbine wheel 30 that may be constructed to rotate in an exhaust gas stream. The exhaust gas stream may include an incoming stream 12 from an internal combustion engine and an outlet stream 14 that may be discharged through the associated vehicle's exhaust system. The turbine wheel 30 may be disposed in a turbine housing 16 that defines multiple volutes 10 and 20, the outline of which is shown. The multiple volutes 10 and 20 channel the exhaust gas so that it impinges upon the turbine wheel 30 and expands to the outlet stream 14 whereby the turbine wheel may convert the exhaust gas into rotational mechanical energy. The exhaust gas flow may be restricted by the flow cross-sectional area of the turbine housing 16, resulting in a pressure and temperature drop between the incoming stream 12 and outlet stream 14. This pressure drop is converted into kinetic energy to drive the turbine wheel 30. Exhaust gas pressure is converted into kinetic energy and the exhaust gas at the turbine wheel circumference 29 is directed at the turbine wheel 30 by the multiple volutes 10 and 20 shown in outline form as defined by the turbine housing 16 with the remainder of the surrounding turbine housing not shown. The turbine performance increases as the pressure drop between the incoming stream 12 and the outlet stream 14 increases. Turbines may be provided with variable turbine geometry to change the flow cross-section between volute channel and turbine wheel inlet. With variable turbine geometry, the volute exit area to the turbine wheel may be changed by variable guide vanes to vary the open cross-section. To avoid the complexity of incorporating variable turbine geometry, the turbine 11 according to a number of variations may be provided with the multiple volutes 10 and 20 with asymmetric exhaust gas passages 23 and 24.

The volutes 10 and 20 may be characterized by an A/R ratio where A is the area of a cross section of the volute and R is the radius of the volute at the cross section's location. This may be visualized with reference to FIG. 2 where the A/R ratio is the open cross sectional area of the volute 20 at point 18 over the radius 19 from the center 21 to the point 18. The volute 20 may be provided with a smaller A/R ratio, and the volute 10 may be provided with a larger A/R ratio, which is the cross sectional area of the volute 10 at point 15, over the radius 17. The smaller A/R ratio of the volute 20 increases the exhaust gas velocity into the turbine wheel 30. This provides increased turbine power at lower engine speeds resulting in higher pressure. The larger A/R ratio of the volute 20 lowers exhaust gas velocity increasing the effective flow capacity of the turbine wheel 30, resulting in lower pressure at the incoming stream 12 and better power at higher engine speeds. The reduced pressure of the incoming stream 12 at the engine exhaust manifold (referred to as P3), is advantageously lower due to inclusion of the larger volute 10 with lower pressure. P3 may also be reduced as a result of an overall efficiency increase from exhaust pulsation management. The higher pressure of the smaller volute 20 may improve the ability to drive exhaust gas recirculation (EGR). The selection of A/R ratio for the multiple volutes may be chosen for particular applications to meet the desired EGR flow and P3 level.

Figure 2:
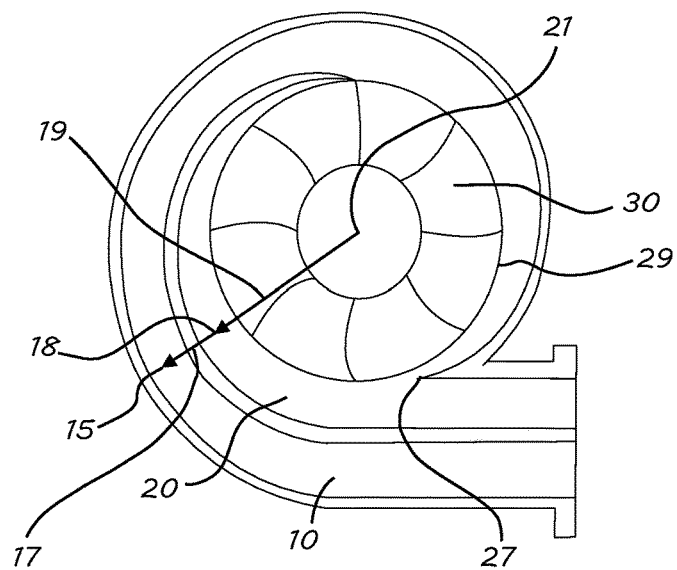
FIG. 2 is a schematic illustration of a dual volute turbocharger turbine according to a number of variations.
Figure 3:
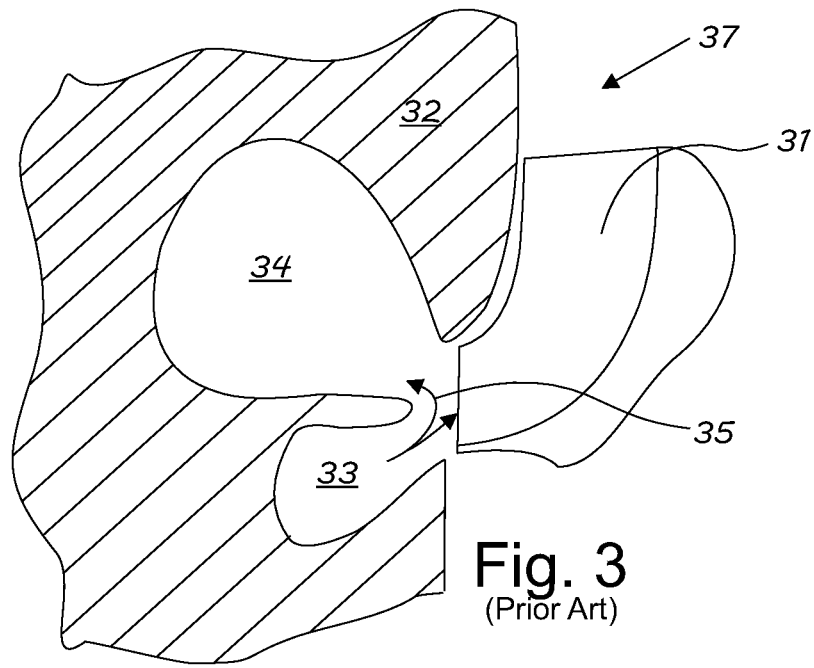
FIG. 3 is a schematic illustration of a prior art twin scroll turbocharger.

As shown in FIG. 2 the volutes 10 and 20 are stacked radially, meaning that all points of the volute 10 are radially outside the volute 20 from the center 21 over the entire length of the volute 20. The volute 20 is positioned radially inside the volute 10 closer to the center 21. Radial stacking provides improved separation between the volutes 10 and 20 thereby inhibiting exhaust gas leakage from a higher pressure stream in one volute to a lower pressure stream in the other volute. With reference to FIG. 3, an illustration of a prior art twin scroll turbocharger 37 is shown. The twin scroll turbocharger 37 includes a turbine wheel 31 and a housing 32 that defines a front scroll 33 and a rear scroll 34. The side-by-side arrangement of the front scroll 33 and the rear scroll 34 allows high pressure leakage 35, or other mixing between the scrolls resulting in reduced efficiency. Further, due to the side-by-side arrangement of the scrolls 33 and 34, the leakage may occur along their entire length around the 360 degree construction of the turbine. In contrast, the volute 20 of the turbine 11 is completely separate from the volute 10 along it entire length, and may include only minor registry around the tongue 27, past the ends of the volutes 10 and 20, but not along their lengths.

Figure 4:
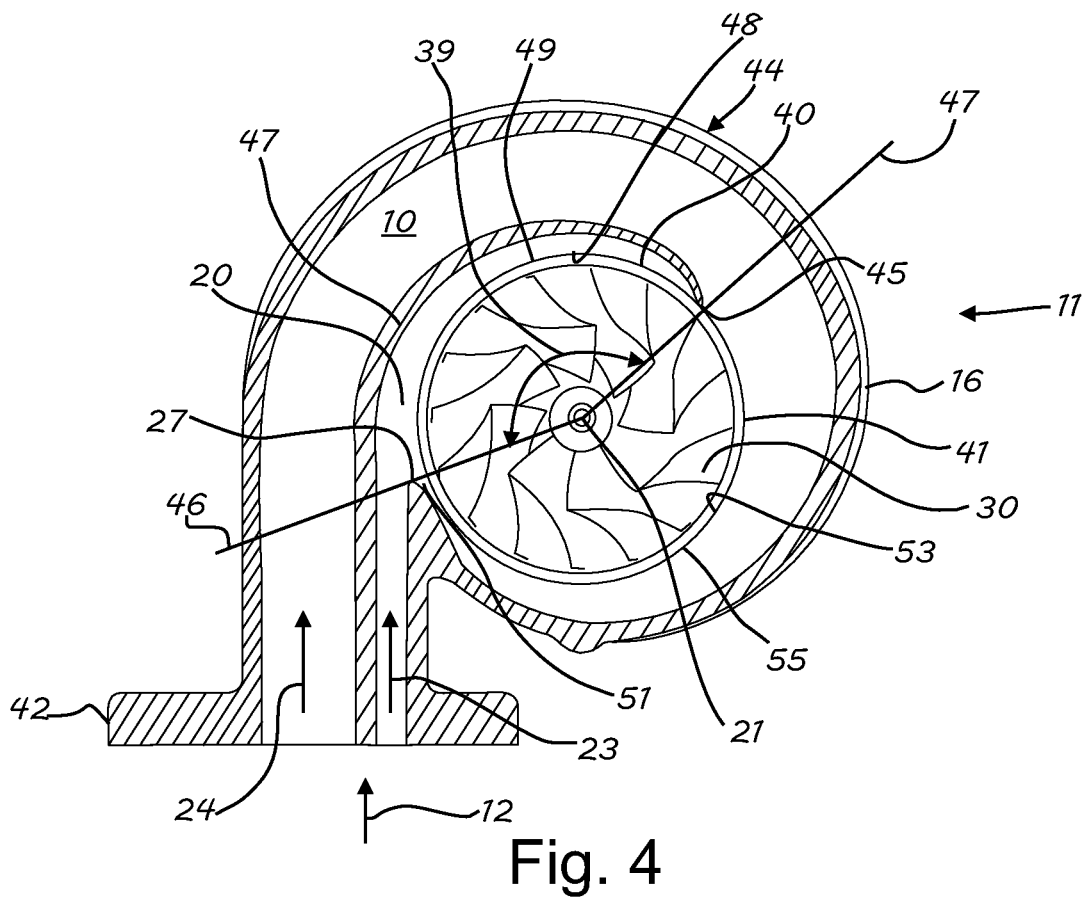
FIG. 4 is an illustration of a dual volute turbocharger turbine according to a number of variations.

The turbine 11 is illustrated in greater detail in FIG. 4 according to a number of variations. With reference thereto, the turbine housing 16 defines a center core 40 that is circular shaped to receive the turbine wheel 30, which rotates about the center 21. The center core 40 includes an outer circumference 41. The tongue 27 is formed in such a manner as to provide a partition between the beginning of the exhaust gas introduction passage 49 on the radially inner side 48 of the volute 20, and the end 51 of the volute 10. The thickness of the tongue 27 is gradually reduced toward its tip. The turbine housing 16 may also include a flange 42 for mounting to an exhaust manifold of the associated engine. The turbine housing 16 may also define a volute section 44, within which the volutes 10 and 20 are defined. The incoming exhaust gas stream 12 may be split into two components, one each of which enters one of the asymmetric exhaust gas passages 23 and 24. For example, the incoming exhaust gas stream 12 may be comprised of a component that feeds the volute 10 through the exhaust gas passage 24 and that may originate at a pair of cylinders from a four cylinder engine such as cylinder numbers 1 and 3, 2 and 3, or 2 and 4. The cylinder pairs may be selected as cylinders that do not fire consecutively, such as cylinders 2 and 3 with an engine that has a firing order of 1-3-4-2. In this case, the volute 20 will be fed by an exhaust stream exiting cylinders 1 and 4. The cylinders selected to feed each volute, of a number of volutes, may be optimized based on engine design including runner volumes, valve profiles, and other specifics.

The volute 20 may extend around 120 to 130 angular degrees of the center core 40, preferably 110 to 140 angular degrees of the center core 40, and most preferably 100 to 160 angular degrees of the center core 40, or any subrange or amount there-between. The volute 20 may be open to the center core 40 over the entire amount of its angular degrees and the volute 10 may be open to the center core 40 over a remaining amount of angular degrees of the center core 40 out of 360 degrees. In the specific example of FIG. 4, the cross-sectional area of the volute 20 may decrease along an angular distance from a maximum near the tongue 27 to a minimum at an angle of 120 degrees at the end 45 of the volute 20. The 120 degree point is measured from a line 46 extending from the center 21 through the tip of the tongue 27 to a line 47 extending from the center 21 through the end 45, and is identified by reference numeral 39. The 120 degree length of the volute 20 along the circumference 41 of the center core 40 may increase pressure for driving EGR. Along its entire length, the volute 20 is separated from the volute 10 by a wall 47 formed by the turbine housing 16. The exhaust gas introduction passage 49 at the radially inner side 48 of the volute 20 is provided in the form of a circumferential slot and is open to the center core 40 at its outer circumference 41, from the tongue 27 to the end 45 so that exhaust gas entering the volute 20 is directed at the turbine wheel 30.

The cross-sectional area of the volute 10 may be consistent along the angular distance from the flange 42 to near the 120 degree line 47 at the end 45 of the volute 20. The volute 10 may continue to the line 46 at the tongue 27, which may be another 240 angular degrees for a full angular distance of 360 degrees around the circumference 41 of the center core 40. The cross sectional area of the volute 10 may decrease along the angular distance from a maximum near the line 47 at the end 45 to a minimum at an angle of 360 degrees at the tongue 27. Along 240 degrees of angular length from the line 47 to the line 46, the radially inner side 53 of the volute 10 is open to the center core 40 through the circumferential slot shaped exhaust gas introduction passage 55 from the end 45 to the tongue 27 so that exhaust gas entering the volute 10 is directed at the turbine wheel 30. At any angular point (such as where the line 46 or the line 47 extends through the volutes 10, 20) around the turbine housing, the volute 20 has a first cross sectional area and the volute 10 has a second cross sectional area and the first cross sectional area is smaller than the second cross sectional area.

Figure 5:
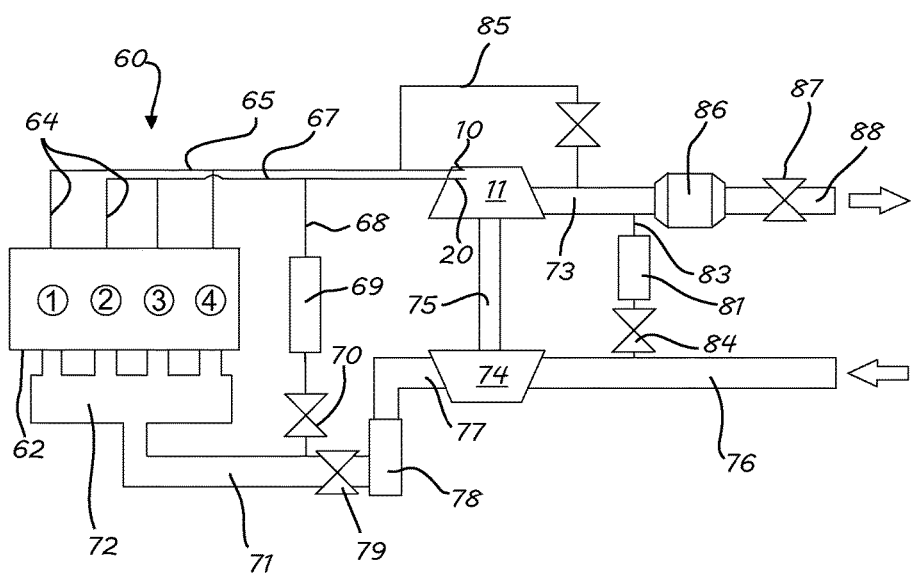
FIG. 5 is a diagrammatic illustration of an engine breathing system according to a number of variations.

In the illustrative variation shown as an engine breathing system 60 of FIG. 5, an internal combustion engine 62 may have a number of cylinders 1-4 for the controlled combustion of fuel to produce power. Exhaust gas generated during combustion exits the engine 62 at an exhaust manifold 64 and may take one of two paths. Cylinders 1 and 4 may be connected to an exhaust passage 65 and cylinders 2 and 3 may be connected with an exhaust passage 67. The exhaust passage 65 may continue to the turbine 11 where it connects with the volute 10.

The exhaust passage 67 may be connected to a high pressure exhaust gas recirculation (HP-EGR), passage 68 that may lead to a heat exchanger 69 and then to a valve 70 for regulating the flow of exhaust gas through the HP-EGR loop. The high pressure designation relates to the unreduced exhaust gas pressure leaving the engine 62 upstream of a turbine 11. The flow of exhaust gas through the HP-EGR loop may continue through the valve 70, when open, into an intake passage 71, and through an intake manifold 72 to the engine 62. Downstream of the passage 68, the exhaust passage 67 may continue to the turbine 11 where it connects with the volute 20. It should be understood that the volute 20 may be disposed radially inside the volute 10 as shown in FIGS. 1, 2 and 4. By using the cylinders 2 and 3 connected to the smaller volute 20 as the source for the HP-EGR loop, higher pressure is available to drive EGR through the passage 68.

Exhaust gases may flow out of the turbine 11 through a passage 73. Through the action of routing exhaust gases to the turbine 11, the compressor 74 may be rotated through the shaft 75. The rotating compressor 74 may draw air in through an intake passage 76, which it compresses. This charges the intake system of the engine 62 through the passage 77, charge air cooler 78, intake throttle valve 79, passage 71 and intake manifold 72. The intake throttle valve 79 may be selectively throttled to enhance the flow of exhaust gas through the HP-EGR loop when desired, and according to a number of variations may be omitted by driving EGR flow through the volute 20 with reduced A/R. The compressor 74 may also draw exhaust gas through the low pressure exhaust gas recirculation (LP-EGR) loop. A LP-EGR passage 83 may lead to a heat exchanger 81 and then to a valve 84 for regulating the flow of exhaust gas through the LP-EGR loop. The low pressure designation relates to the reduced exhaust gas pressure leaving the turbine 11. The flow of exhaust gas through the LP-EGR loop may continue through the valve 84 when open, and into the compressor 74 and on to the engine 62 with the intake air.

A waste gate duct 85 with a valve may provide a bypass around the turbine 11. Exhaust gas leaving the system 60 may proceed through the after treatment system 86 and an exhaust throttle valve 87 and on through the passage 88. The exhaust throttle valve 87 may selectively throttle flow when needed such as to increase the flow of exhaust gas through the LP-EGR loop.

By connecting cylinders 1 and 4 to the volute 10 and cylinders 2 and 3 to the volute 20, improved pulse separation may be achieved. When the engine 62 operates, exhaust gas is discharged into the volute 10 and the volute 20 alternatively, with drops in pressure or pulsations, as the engine discharges into the opposite volute. The dynamic pressure of exhaust gas pulsation results, wherein at low engines speeds, boost pressure may be increased.

Through the asymmetric separated multiple volutes 10 and 20, EGR flow may be promoted by use of a higher pressure exhaust associated with the smaller volute, improved pulse separation may be achieved by separating the exhaust streams for different cylinders, and fuel economy may be increased, without the use of variable turbine geometry. Lower exhaust back pressure and increased efficiency of the turbine contribute to these effects.

The following description of variants is only illustrative of components, elements, acts, products and methods considered to be within the scope of the invention and is not in any way intended to limit such scope by what is specifically disclosed or not expressly set forth. Components, elements, acts, products and methods may be combined and rearranged other than as expressly described herein and still are considered to be within the scope of the invention.

Variation 1 may include a product for use in a turbocharger system. A turbine housing may define a center core that is circular in shape with a circumference. The turbine housing may define a first volute that extends for a length around only a part of the circumference of the center core, and a second volute that is positioned radially outside the first volute and that extends entirely around the circumference of the center core. The first volute and the second volute may define first and second exhaust gas passages through the turbine housing that may be asymmetric. All points of the second volute may be radially outside the first volute from the center core over the entire length of the first volute.

Variation 2 may include the product according to variation 1 and may include an engine having at least four cylinders. The first volute may be connected to a first two of the at least four cylinders. The second volute may be connected to a second two of the at least four cylinders. No one cylinder of the at least four cylinders may be connected to both the first and second volutes.

Variation 3 may include the product according to variation 2 wherein the engine may have an intake system. A high pressure exhaust gas recirculation loop may be connected to the first two of the at least four cylinders. The high pressure exhaust gas recirculation loop may be selectively connected to the intake system of the engine so that pressure developed by the first volute is used to drive exhaust gas recirculation flow through the high pressure exhaust gas recirculation loop.

Variation 4 may include the product according to variation 3 wherein the intake system does not include an intake throttle valve.

Variation 5 may include the product according to variation 1 wherein the first volute extends around 120-130 angular degrees, preferably 110-140 angular degrees, and most preferably 100-160 angular degrees of the center core.

Variation 6 may include the product according to variation 5 wherein the first volute is open to the center core over the entire amount of its angular degrees and the second volute is open to the center core over a remaining amount of angular degrees of the center core.

Variation 7 may include the product according to variation 1 and may include a turbine rotor disposed in the center core, wherein the turbine rotor does not include variable turbine geometry.

Variation 8 may include the product according to variation 1 wherein the first volute may be separated by a wall from the second volute completely along the length of the first volute. The second volute may be spaced apart from the circumference of the center core by the first volute for the length of the first volute Variation 9 may include the product according to variation 1 wherein at any angular point along the length of the first volute around the turbine housing, the first volute has a first cross sectional area and the second volute has a second cross sectional area and the first cross sectional area is smaller than the second cross sectional area.

Variation 10 may include the product according to variation 1 wherein at an angular point around the center core, the first volute may have a first radius and the second volute may have a second radius wherein the first cross sectional area over the first radius is smaller than the second cross sectional area over the second radius.

Variation 11 may include the product according to variation 1 with a wall separating the first volute from the second volute, preventing leakage between the first volute and the second volute.

Variation 12 may include the product according to variation 1 wherein the second volute may have a cross section that is constant along the length of the first volute and reduces from an end of the first volute to a tongue of the turbine housing.

Variation 13 may include the product according to variation 12 wherein the tongue may separate the first volute from the second volute.

Variation 14 may include the product according to variation 1 with an engine having an exhaust manifold. The second cross sectional area may be sized to reduce pressure in the exhaust manifold.

Variation 15 may include a method of driving exhaust gas recirculation and improving pulse separation in a turbocharger turbine. A turbine housing may be provided with a center core. A turbine wheel may be positioned in the center core. Only a portion of the turbine wheel may be surrounded by a first volute. The first volute and an entirety of the center core may be surrounded by a second volute. A wall may be provided on the turbine housing to separate the first volute from the second volute. A tongue may be provided on the turbine housing so as to further separate the first volute from the second volute. The first volute may be provided with a first cross sectional area that reduces from the tongue to an end of the first volute. The second volute may be provided with a second cross sectional area that is larger than the first cross sectional area. A first opening may be provided between the first volute and the center core over the entire length of the first volute from the tongue to the end. A second opening may be provided between the second volute and the center core from the end of the first volute to the tongue. Exhaust gas flow may be driven through the high pressure exhaust gas recirculation loop by connecting the high pressure exhaust gas recirculation loop to the first volute, and not to the second volute.

The above description of select variations within the scope of the invention is merely illustrative in nature and, thus, variations or variants thereof are not to be regarded as a departure from the spirit and scope of the invention.

What is claimed is:

1. A product for use in a turbocharger system comprising:
    a turbine housing defining a center core that is circular in shape with a circumference, and the turbine housing defining a first volute that extends for a length around only a part of the circumference of the center core, and a second volute that is positioned radially outside the first volute and that extends entirely around the circumference of the center core, the first volute and the second volute defining first and second exhaust gas passages through the turbine housing that are asymmetric, wherein all points of the second volute are radially outside the first volute from the center core, entirely over the length of the first volute;
    an engine having at least four cylinders and wherein the first volute is connected to a first two of the at least four cylinders and wherein the second volute is connected to a second two of the at least four cylinders, and wherein no one cylinder of the at least four cylinders is connected to both the first and second volutes and wherein the engine has an intake system and further comprising a high pressure exhaust gas recirculation loop connected to the first two of the at least four cylinders, the high pressure exhaust gas recirculation loop selectively connected to the intake system of the engine so that a pressure developed by the first volute is used to drive exhaust gas recirculation flow through the high pressure exhaust gas recirculation loop;
    a tongue that separates the first volute from the second volute constructed and arranged to define a partition between the first exhaust gas passage on the radially inner side of the first volute and the center core such that the first volute and the second volute are in fluid communication with one another; and
    wherein the first volute extends around 100-160 angular degrees of the center core.

2. The product according to claim 1 wherein the intake system does not include an intake throttle valve.

3. The product according to claim 1 wherein the first volute extends around 120-130 angular degrees of the center core.

4. The product according to claim 3 wherein the first volute is open to the center core over the entire amount of its angular degrees and the second volute is open to the center core over a remaining amount of angular degrees of the center core.

5. The product according to claim 1 further comprising a turbine rotor disposed in the center core, wherein the turbine rotor does not include variable turbine geometry.

6. The product according to claim 1 wherein the first volute is separated by a wall from the second volute completely along the length of the first volute, wherein the second volute is spaced apart from the circumference of the center core by the first volute for the length of the first volute.

7. The product according to claim 1 wherein at any angular point along the length of the first volute around the turbine housing, the first volute has a first cross sectional area and the second volute has a second cross sectional area and the first cross sectional area is smaller than the second cross sectional area.

8. The product according to claim 1 wherein at an angular point around the center core, the first volute has a first radius and the second volute has a second radius, wherein a first cross sectional area over the first radius is smaller than a second cross sectional area over the second radius.

9. The product according to claim 8 wherein the second cross sectional area is constant along the first volute and reduces from an end of the first volute to a tongue of the turbine housing.

10. The product according to claim 9 wherein the tongue separates the first volute from the second volute.

11. The product according to claim 1 further comprising a wall separating the first volute from the second volute, the wall preventing leakage between the first volute and the second volute.

12. The product according to claim 1 further comprising an engine having an exhaust manifold and wherein a second cross sectional area is sized to reduce pressure in the exhaust manifold.

13. The product according to claim 1 wherein the first volute extends around 110-140 angular degrees of the center core.

14. A method of driving exhaust gas recirculation and improving pulse separation in a turbocharger turbine comprising the steps of:
    providing a turbine housing with a center core;
    positioning a turbine wheel in the center core;
    surrounding only a portion of the turbine wheel with a first volute having a first end;
    surrounding the first volute and an entirety of the center core with a second volute having a second end;
    providing a wall on the turbine housing to separate the first volute from the second volute;
    providing a tongue on the turbine housing so as to further separate the first volute from the second volute, the tongue defining a minor registry at the first end of the first volute and at the second end of the second volute, the tongue being constructed and arranged to define a partition between a first exhaust gas passage on the radially inner side of the first volute and the center core such that the first volute and the second volute are in fluid communication with one another;
    providing the first volute with a first cross sectional area that reduces from the tongue to an end of the first volute wherein the first volute extends around 100-160 angular degrees of the center core;
    providing the second volute with a second cross sectional area that is larger than the first cross sectional area, the second volute being positioned radially outside the first volute and that extends entirely around a circumference of the center core;
    providing a first opening between the first volute and the center core over the entire length of the first volute from the tongue to the end;

providing a second opening between the second volute and the center core from the end of the first volute to the tongue;

providing an engine having at least four cylinders and wherein the first volute is connected to a first two of the at least four cylinders and wherein the second volute is connected to a second two of the at least four cylinders, and wherein no one cylinder of the at least four cylinders is connected to both the first and second volutes and wherein the engine has an intake system and further comprising a high pressure exhaust gas recirculation loop connected to the first two of the at least four cylinders, the high pressure exhaust gas recirculation loop selectively connected to the intake system of the engine so that a pressure developed by the first volute is used to drive exhaust gas recirculation flow through the high pressure exhaust gas recirculation loop; and driving exhaust gas flow through a high pressure exhaust gas recirculation loop by connecting the high pressure exhaust gas recirculation loop to the first volute, and not to the second volute.

\* \* \* \* \*